US008408670B2

(12) United States Patent
Komatsu

(10) Patent No.: US 8,408,670 B2
(45) Date of Patent: Apr. 2, 2013

(54) DISCHARGE INSPECTION APPARATUS AND DISCHARGE INSPECTION METHOD

(75) Inventor: Shinya Komatsu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 366 days.

(21) Appl. No.: 12/897,262

(22) Filed: Oct. 4, 2010

(65) Prior Publication Data

US 2011/0084998 A1 Apr. 14, 2011

(30) Foreign Application Priority Data

Oct. 8, 2009 (JP) ................................ 2009-234473

(51) Int. Cl.
*C09D 11/00* (2006.01)

(52) U.S. Cl. ........................................................ 347/14

(58) Field of Classification Search ..................... 347/14
See application file for complete search history.

(56) References Cited

U.S. PATENT DOCUMENTS 7,543,904 B2 6/2009 Izuo
2008/0259116 A1* 10/2008 Oki et al. ........................ 347/31
2009/0135231 A1* 5/2009 Umeda .......................... 347/71
2010/0060690 A1* 3/2010 Hosokawa et al. ............. 347/14
2011/0050775 A1* 3/2011 Komatsu et al. ................ 347/14

FOREIGN PATENT DOCUMENTS

JP 2007-152888 6/2007

* cited by examiner

*Primary Examiner* — Laura Martin

(57) ABSTRACT

A discharge inspection apparatus includes: a first electrode for detection which faces a nozzle, that discharges liquid of a first potential, at a predetermined interval and has a second potential different from the first potential; a second electrode for detection which faces a nozzle, that discharges the liquid of the first potential, at a predetermined interval and has the second potential; an inspection section which inspects whether or not liquid is discharged from the nozzle on the basis of electrical changes which occur at the first electrode for detection and the second electrode for detection due to the discharging of the liquid of the first potential from the nozzle; a first insulating receiving section which holds the first electrode for detection; and a second insulating receiving section which holds the second electrode for detection and is disposed with a space interposed between the second receiving section and the first receiving section.

8 Claims, 11 Drawing Sheets

DISCHARGE INSPECTION APPARATUS AND DISCHARGE INSPECTION METHOD

CROSS-REFERENCE TO RELATED APPLICATION

Japanese Patent Application No. 2009-234473 is hereby incorporated by reference in its entirety.

BACKGROUND

1. Technical Field

The present invention relates to a discharge inspection apparatus and a discharge inspection method.

2. Related Art

As a liquid discharge apparatus such as an ink jet printer, a liquid discharge apparatus is proposed in which electrically-charged ink is discharged from a head toward an electrode for detection and liquid discharge inspection is performed on the basis of an electrical change which occurs in the electrode.

JP-A-2007-152888 is an example of the related art.

In the case of performing liquid discharge inspection with respect to a liquid discharge apparatus having a plurality of heads, it is possible to shorten discharge inspection time by providing an electrode for detection for each head. However, it is necessary to arrange the electrodes for detection in accordance with the arrangement of the heads in the liquid discharge apparatus, so that the distance between the electrodes becomes relatively narrow. Therefore, there is a danger that minute liquid droplets or the like which are generated at the time of liquid discharging are deposited on the electrode for detection, so that the electrodes for detection are conductively connected to each other through the deposited liquid droplets. Then, the liquid discharge inspection cannot be precisely performed.

SUMMARY

An advantage of some aspects of the invention is that it performs discharge inspection as precisely as possible.

According to a first aspect of the invention, there is provided a discharge inspection apparatus including: a first electrode for detection which faces a nozzle, that discharges liquid with a first potential, at a predetermined spacing and has a second potential different from the first potential; a second electrode for detection which faces a nozzle, that discharges the liquid of the first potential at a predetermined spacing and has the second potential; an inspection section which inspects whether or not liquid is discharged from the nozzle on the basis of electrical changes which occur at the first electrode for detection and the second electrode for detection due to the discharging of the liquid of the first potential from the nozzle; a first insulating receiving section which holds the first electrode for detection; and a second insulating receiving section which holds the second electrode for detection and is disposed with a space interposed between the second receiving section and the first receiving section.

Other features of the invention will become apparent from the description of this specification and the accompanying drawings.

BRIEF DESCRIPTION OF THE DRAWINGS

The invention will be described with reference to the accompanying drawings, wherein like numbers reference like elements.

FIG. 7A is a cross-sectional view of a receiving section of a comparative example and FIG. 7B is a diagram showing a state in which ink is deposited on the electrodes for detection and the like.

DESCRIPTION OF EXEMPLARY EMBODIMENTS

Outline of Disclosure

Figure 1:
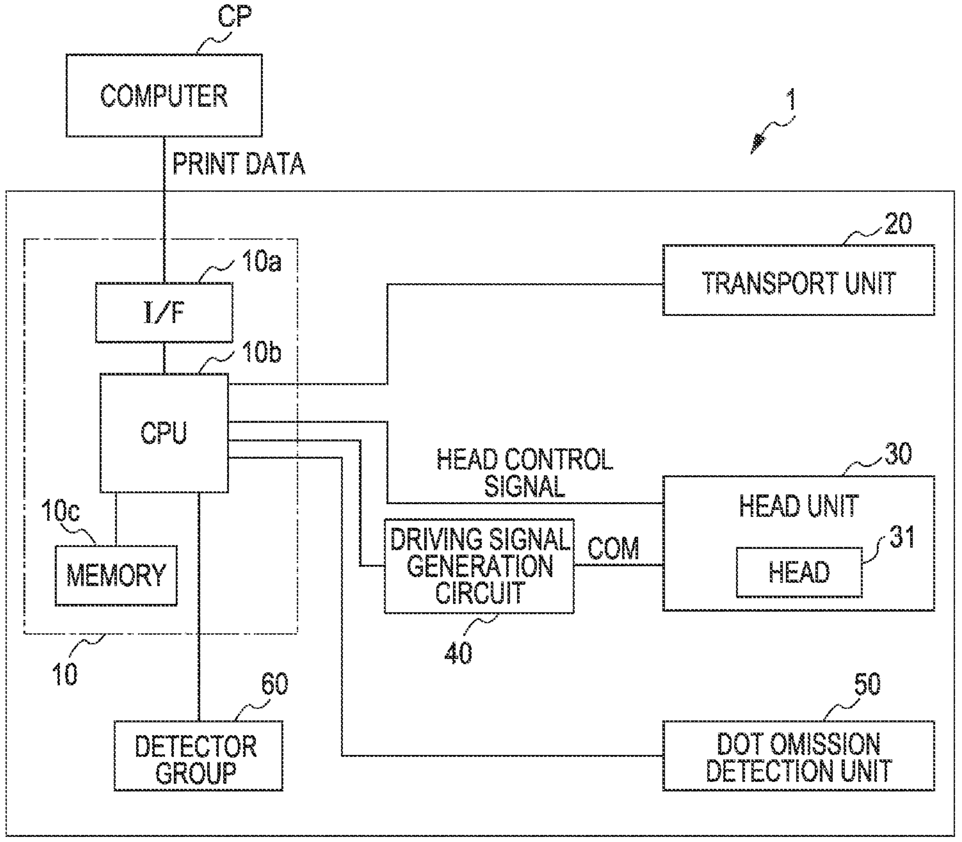
FIG. 1 is a block diagram showing the configuration of a printing system.

At least the following aspects will become apparent from the description of this specification and the description of the accompanying drawings.

That is, according to a first aspect of the invention, there is provided a discharge inspection apparatus including: a first electrode for detection which faces a nozzle, that discharges liquid with a first potential, at a predetermined spacing and has a second potential different from the first potential; a second electrode for detection which faces a nozzle, that discharges the liquid of the first potential at a predetermined spacing and has the second potential; an inspection section which inspects whether or not liquid is discharged from the nozzle on the basis of electrical changes which occur at the first electrode for detection and the second electrode for detection due to the discharging of the liquid with the first potential from the nozzle; a first insulating receiving section which holds the first electrode for detection; and a second insulating receiving section which holds the second electrode for detection and is disposed with a space interposed between the second receiving section and the first receiving section.

According to such a discharge inspection apparatus, the conductive connection of the first electrode for detection and the second electrode for detection to each other through liquid can be suppressed, so that it is possible to perform the discharge inspection as precisely as possible.

In such a discharge inspection apparatus, in at least one receiving section of the first receiving section and the second receiving section, the end edge on the space side among end edges of the upper surface of the receiving section protrudes further than the electrode for detection.

According to such a discharge inspection apparatus, it becomes more difficult for liquid deposited on the first electrode for detection and liquid deposited on the second electrode for detection to be connected to each other, so that it is possible to perform the discharge inspection with more precision.

In such a discharge inspection apparatus, in at least one receiving section of the first receiving section and the second receiving section, a cutout portion is provided at the side surface on the space side among side surfaces of the receiving section.

According to such a discharge inspection apparatus, it becomes more difficult for liquid deposited on the first electrode for detection and liquid deposited on the second electrode for detection to be connected to each other, so that it is possible to perform the discharge inspection with more precision.

In such a discharge inspection apparatus, the cutout portion has a surface which forms an angle of 90 degrees with respect to the side surface of the receiving section and a surface which forms an angle of 90 degrees with respect to the bottom surface of the receiving section.

According to such a discharge inspection apparatus, it becomes more difficult for liquid deposited on the first electrode for detection and liquid deposited on the second electrode for detection to be connected to each other, so that it is possible to perform the discharge inspection with more precision.

In such a discharge inspection apparatus, another cutout portion is provided at the surface which forms an angle of 90 degrees with respect to the side surface of the receiving section, among the surfaces that the cutout portion has.

According to such a discharge inspection apparatus, it becomes more difficult for liquid deposited on the first electrode for detection and liquid deposited on the second electrode for detection to be connected to each other, so that it is possible to perform the discharge inspection with more precision.

In such a discharge inspection apparatus, the first receiving section and the second receiving section are mounted on a base member, and an insulation treatment is carried out on the surface of the base member, which comes into contact with the first receiving section and the second receiving section.

According to such a discharge inspection apparatus, the conductive connection of the electrodes for detection and the base member to each other through liquid can be prevented, so that it is possible to perform the discharge inspection as precisely as possible.

In such a discharge inspection apparatus, the first receiving section and the second receiving section are mounted on the base member, a signal line which is connected to the first electrode for detection penetrates the first receiving section and the base member, and a signal line which is connected to the second electrode for detection penetrates the second receiving section and the base member.

According to such a discharge inspection apparatus, it is possible to easily perform a wiring treatment of the signal lines and it is possible to prevent the signal lines from being located at the space between the receiving sections.

Also, according to a second aspect of the invention, there is provided a discharge inspection method including: making a nozzle which discharges liquid with a first potential face a first electrode for detection which has a second potential different from the first potential and is held on a first insulating receiving section; inspecting whether or not liquid is discharged from the nozzle on the basis of an electrical change which occurs at the first electrode for detection due to the discharging of the liquid of the first potential from the nozzle; making a nozzle which discharges the liquid of the first potential face a second electrode for detection which has the second potential and is held on a second insulating receiving section which is disposed with a space interposed between the second receiving section and the first receiving section; and inspecting whether or not liquid is discharged from the nozzle on the basis of an electrical change which occurs at the second electrode for detection due to the discharging of the liquid with the first potential from the nozzle.

According to such a discharge inspection method, the conductive connection of the first electrode for detection and the second electrode for detection to each other through liquid can be suppressed, so that it is possible to perform the discharge inspection as precisely as possible.

Concerning Printing System

Hereinafter, a printing system in which a printer and a computer are connected to each other will be explained by taking an ink jet printer (hereinafter referred to as a printer) as an example of a liquid discharging apparatus.

Figure 2:
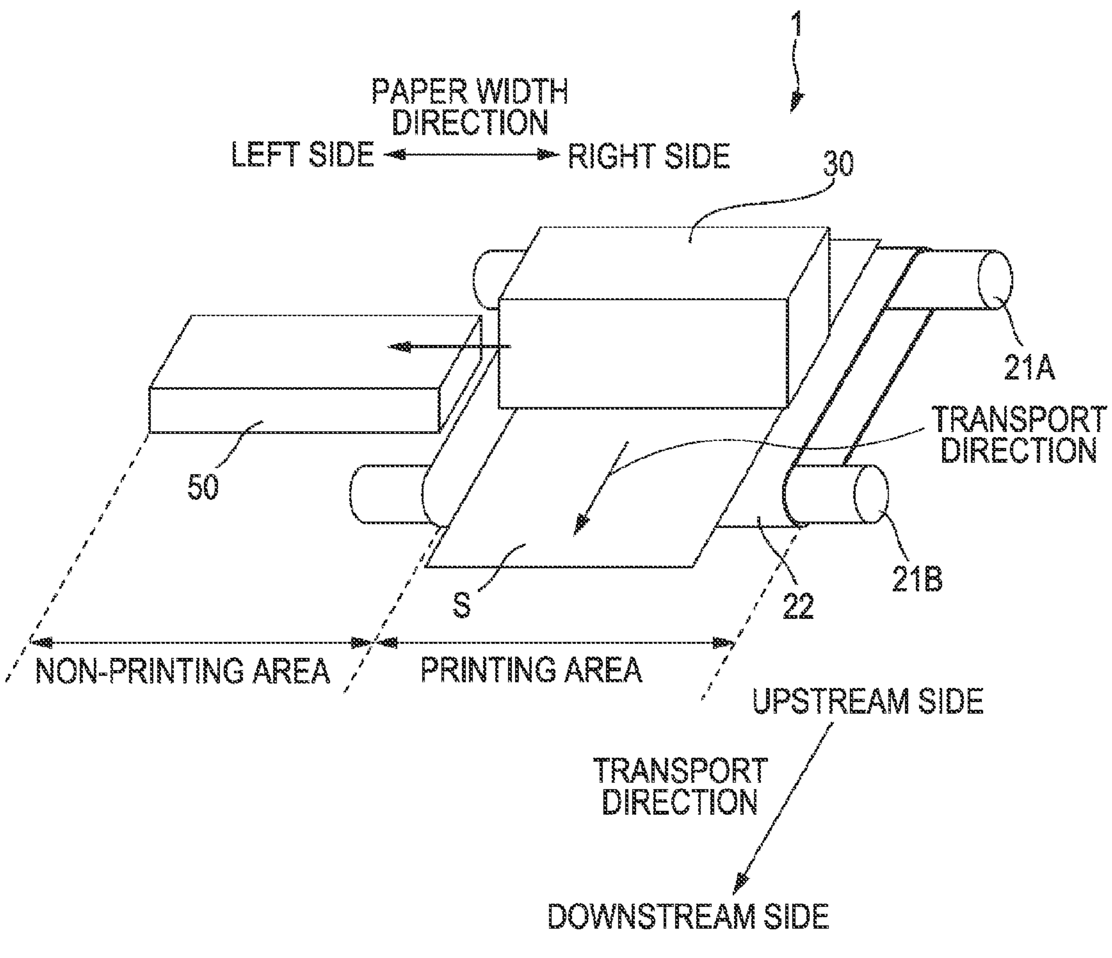
FIG. 2 is a schematic diagram of a printer.

FIG. 1 is a block diagram showing the configuration of the printing system. FIG. 2 is a schematic diagram of a printer 1. The printer 1, which receives print data from a computer CP which is an external apparatus, controls each unit (a transport unit 20, a head unit 30, a driving signal generation circuit 40, and a dot omission detection unit 50) by a controller 10, thereby printing an image on a medium S (paper or the like). Also, a detector group 60 monitors the situation in the inside of the printer 1, and on the basis of the detection results, the controller 10 controls each unit. An interface section 10*a* in the controller 10 is for performing the transmitting and receiving of data between the computer CP which is an external apparatus and the printer 1. A CPU 10*b* is an arithmetic processing device for performing the control of the printer 1 as a whole. A memory 10*c* is for securing an area which stores a program of the CPU 10*b*, a working area, or the like.

The transport unit 20 sends the paper S to a printable position and transports the paper S by a predetermined transport amount in a transport direction at the time of printing. A ring-shaped transport belt 22 is rotated by transport rollers 21A and 21B, whereby the paper S on the transport belt 22 is transported. In addition, the paper S is held on the transport belt 22 by electrostatic adsorption or vacuum adsorption.

The head unit 30 is for discharging ink onto the medium S and has a plurality of heads 31 arranged in a paper width direction. At a nozzle plate of the bottom surface of the head 31, a plurality of nozzles which serves as ink discharging portions is provided. Also, the nozzle plate is connected to a ground line, thereby having a ground potential. Then, at each nozzle, a pressure chamber (not shown) in which ink is contained and a driving device (for example, a piezoelectric device) for changing a capacity of the pressure chamber and thereby discharging the ink, are provided. The driving device is working by a driving signal COM generated by the driving signal generation circuit 40, so that the ink is discharged from the nozzle.

The dot omission detection unit 50 (the details will be described later) inspects whether or not ink is normally discharged from the nozzle provided at the head 31.

Figure 3A:
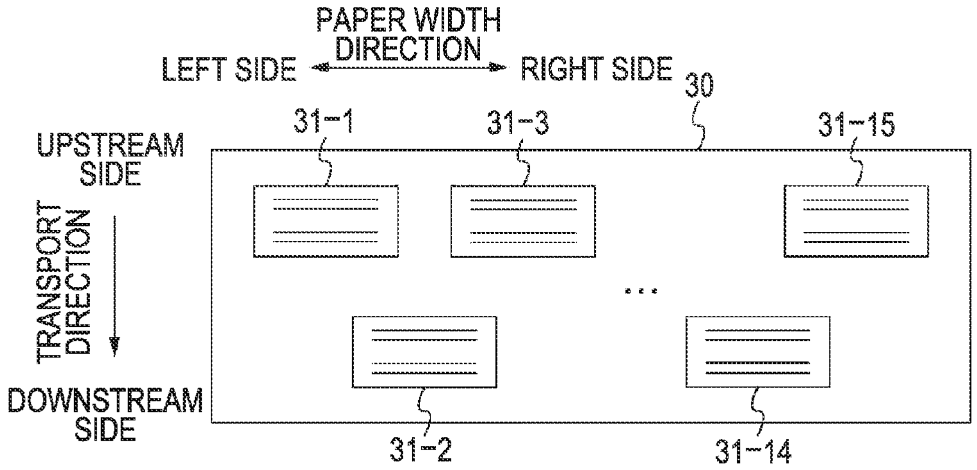
FIG. 3A is a diagram showing arrangement of heads and FIG. 3B is a diagram showing nozzle arrangement in each head.
Figure 3B:
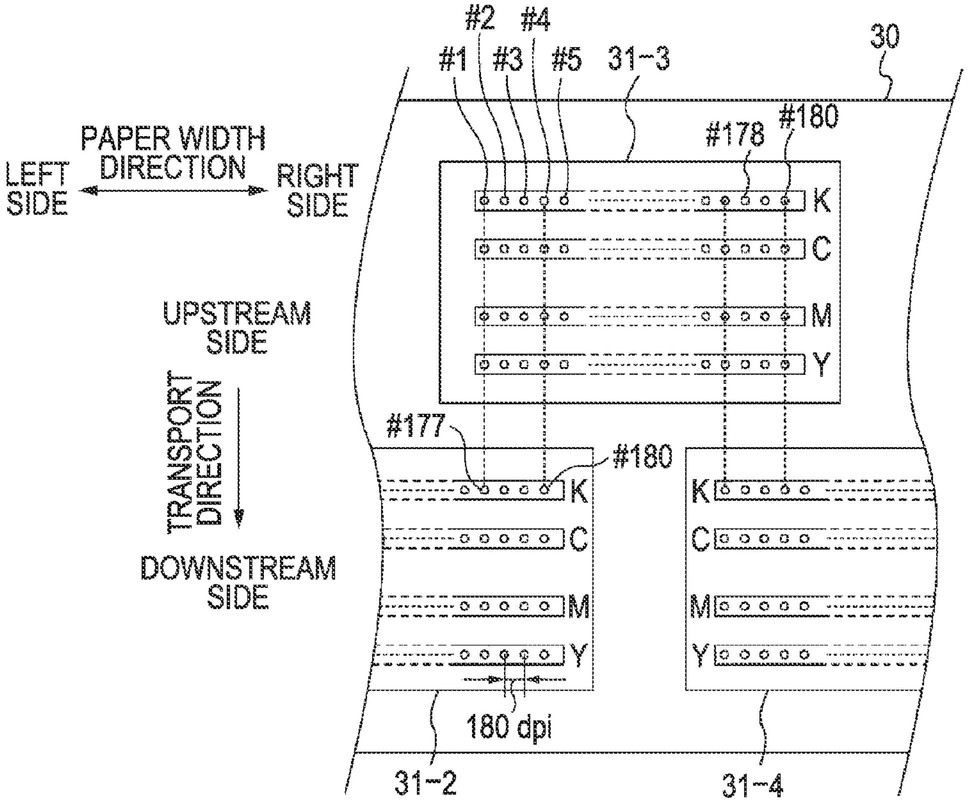

FIG. 3A is a diagram showing arrangement of the heads 31 in the head unit 30, and FIG. 3B is a diagram showing nozzle arrangement in each head 31. In addition, the drawings are diagrams showing the heads 31 and the nozzles, which are virtually viewed from the upper surface of the head unit 30. Here, the head unit 30 is assumed to have fifteen of the heads 31, and the heads are numbered in ascending order (31-1, 31-2 . . . ) from the head 31 on the left side in the paper width direction. Also, since end portions of the heads (for example, 31-1 and 31-2) adjacent to each other in the paper width direction overlap with each other, the head (for example, 31-2) on one side is disposed being shifted further to the downstream side in the transport direction than the head (for example, 31-1) on the other side.

Then, as shown in FIG. 3B, in each head 31, there are formed a yellow nozzle row Y which discharges yellow ink, a magenta nozzle row M which discharges magenta ink, a cyan nozzle row C which discharges cyan ink, and a black nozzle row K which discharges black ink. Each nozzle row is provided with 180 nozzles. In each nozzle row, the nozzles are numbered in ascending order (#1 to #180) from the nozzle on the left side in the paper width direction. Also, the nozzles of each nozzle row are aligned at regular intervals, 180 dpi, in the paper width direction. Then, four nozzles (#177 to #180) on the right side of the left head (for example, 31-2) of two heads (for example, 31-2 and 31-3) which are lined up in the paper width direction are disposed to overlap with four nozzles (#1 to #4) on the left side of the right head (for example, 31-3). In this manner, in the head unit 30, a plurality of nozzles is arranged at regular intervals (180 dpi) in the paper width direction.

In such a printer 1, when the controller 10 receives print data, the controller 10 feeds the paper S to be printed up to the upper side of the transport belt 22 and then transports the paper S on the transport belt 22 below the head unit 30 at a constant speed without stopping. While the paper S is transported below the head unit 30, ink is intermittently discharged from each nozzle. As a result, an image is printed on the paper S.

Concerning Discharge Inspection

If ink is not discharged from the nozzle for a long time or foreign material such as paper dust is attached to the nozzle, clogging of the nozzle often occurs. If the nozzle is clogged, ink is not discharged when ink should be discharged from the nozzle, so that a phenomenon (dot omission) occurs in which a dot is not formed at a place where a dot should be formed. If “dot omission” occurs, image quality is degraded. Therefore, in this embodiment, “discharge inspection” is carried out by the dot omission detection unit 50 and in a case where a “dot omission nozzle” is detected, a “recovery operation” (flushing, pump suction, or the like) is performed, thereby making it so that ink can be discharged normally from the dot omission nozzle.

In addition, as shown in FIG. 2, the dot omission detection unit 50 is located at a non-printing area. Accordingly, at the time of printing, the head unit 30 moves to a printing area, thereby making the head unit 30 face the medium S, and at the time of discharge inspection, the head unit 30 moves to the non-printing area, thereby making the head unit 30 face the dot omission detection unit 50. Also, it is preferable that the discharge inspection is carried out immediately after a power supply of the printer 1 is turned on and when the printer 1 receives the print data from the computer CP, thereby starting printing, and further, in a case where printing is continued for a long time, it is preferable if the discharge inspection is carried out at predetermined time intervals.

Concerning the Dot Omission Detection Unit 50

Figure 4A:
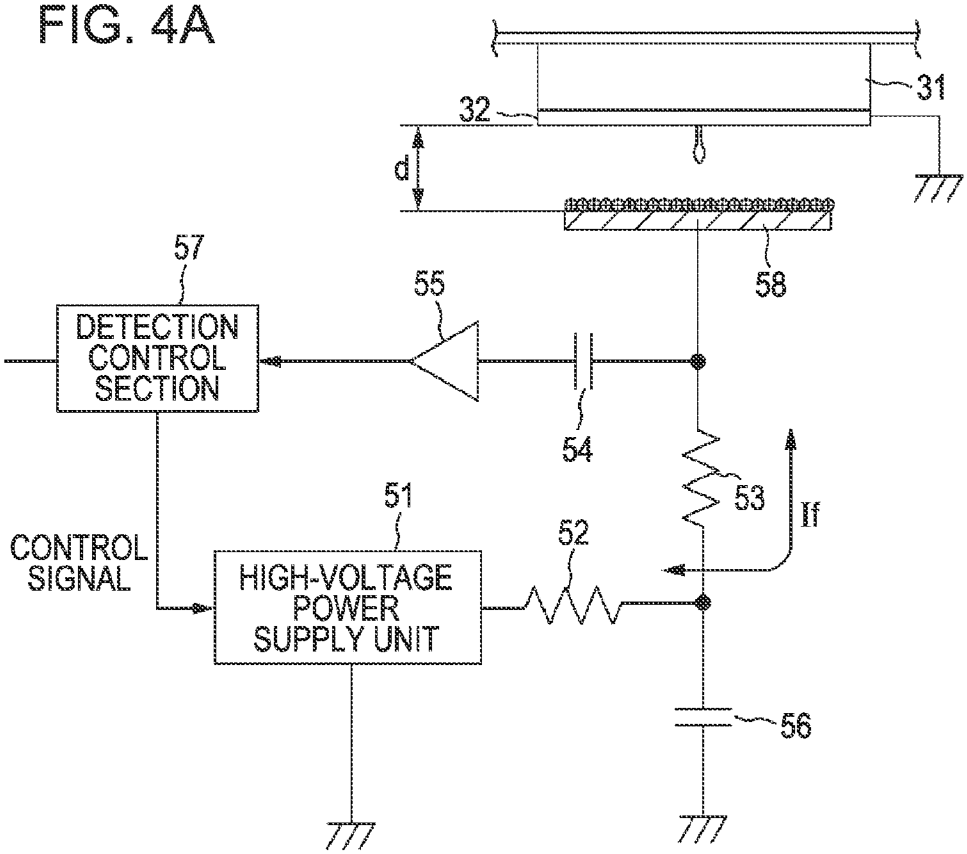
FIG. 4A is a diagram explaining a dot omission detection unit and FIG. 4B is a block diagram explaining a detection control section.
Figure 4B:
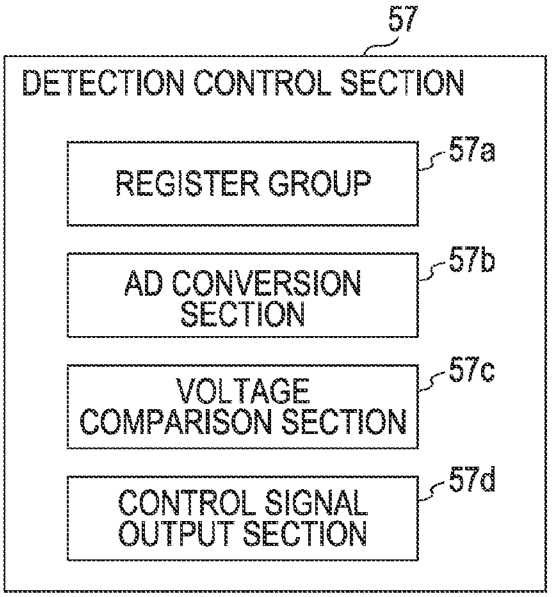
Figure 5:
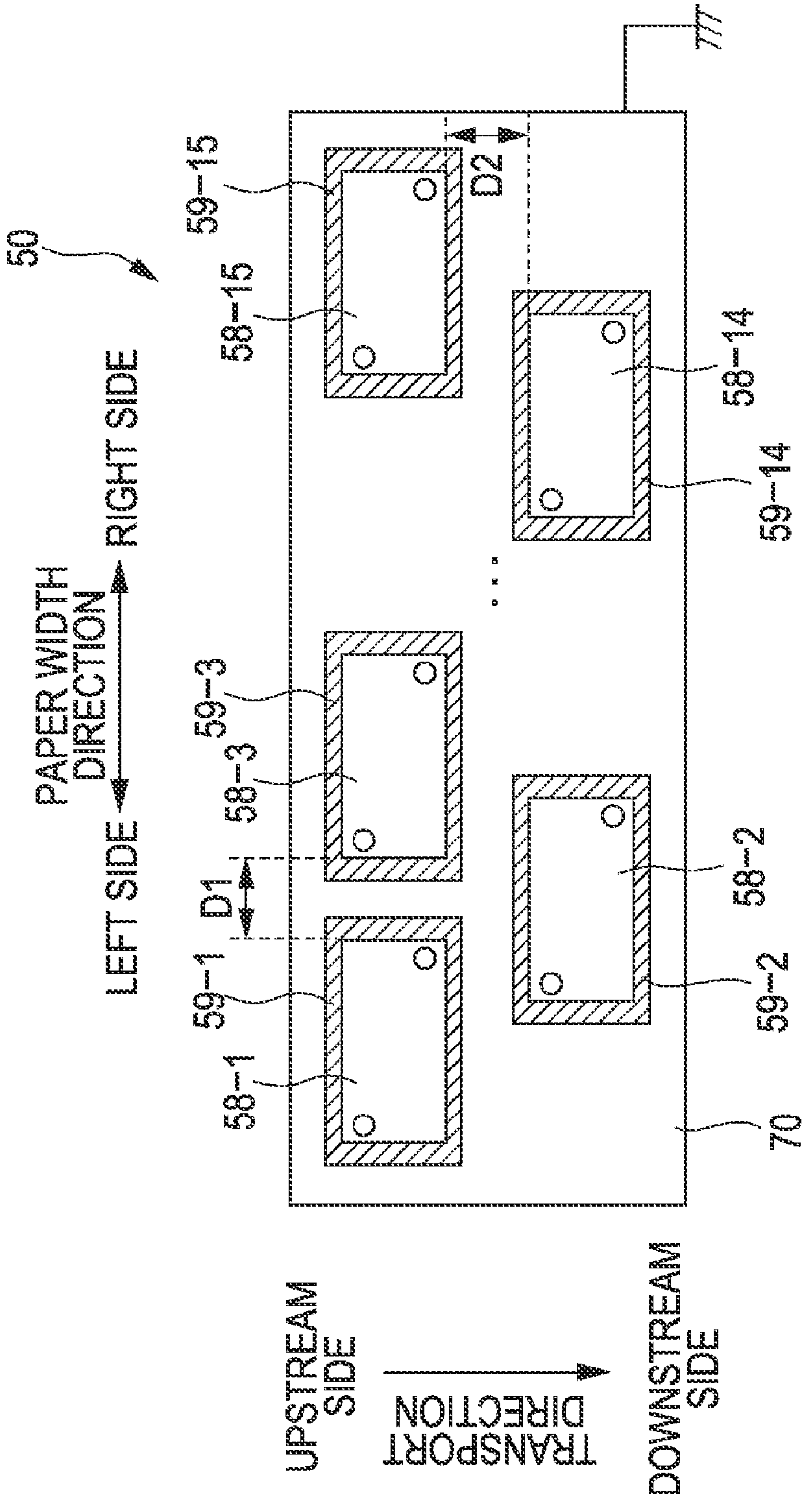
FIG. 5 is a diagram showing a state in which electrodes for detection are mounted on a base member.

FIG. 4A is a diagram explaining the dot omission detection unit 50, and FIG. 4B is a block diagram explaining a detection control section 57. FIG. 5 is a diagram viewed from above showing a state in which electrodes for detection 58 are mounted on a base member 70. As shown in FIG. 4A, the dot omission detection unit 50 (equivalent to the discharge inspection apparatus) includes a high-voltage power supply unit 51, a first limiting resistor 52, a second limiting resistor 53, a capacitor for detection 54, an amplifier 55, a smoothing capacitor 56, a detection control section 57, and the electrode for detection 58.

At the time of the discharge inspection, as shown in FIG. 4A, a nozzle face 32 of the head 31 is disposed so as to face the electrode for detection 58 at a predetermined interval d. As shown in FIG. 5, the electrode for detection (a cross-hatched portion) is a quadrangular metal plate (for example, stainless steel or the like) and has a size of the extent capable of facing the entire surface of the nozzle face 32 of each head 31. Then, at the time of the discharge inspection, the electrode for detection 58 has a high potential in the order of 600 V to 1 kV. On the other hand, the printer 1 of this embodiment has a plurality of heads 31-1 to 31-15, as shown in FIG. 3A. Therefore, in order to shorten discharge inspection time, the electrode for detection 58 is provided for each head 31. Then, the electrodes for detection 58 are disposed at the base member (FIG. 5) in accordance with the arrangement (FIG. 3A) of the heads 31 in the head unit 30 such that all the electrodes for detection 58-1 to 58-15 can simultaneously face the corresponding heads 31-1 to 31-15. By doing so, since the discharge inspection of a plurality of heads 31 can be simultaneously carried out, even in the printer 1 having a plurality of heads 31, the discharge inspection time can be shortened.

In addition, here, the base member 70, on which the electrodes for detection 58 are mounted, is made of a metal plate, so that the base member 70 also serves as a shield plate for noise prevention. Although in FIG. 5, a state is shown in which the shield plate (the base member 70) is provided below the electrodes for detection 58, the shield plate may also be provided in the surroundings of the electrode for detection 58. Then, the base member 70 has a ground potential, whereas the electrodes for detection 58 has a high potential in the order of 600 V to 1 kV at the time of the discharge inspection. Accordingly, it is necessary to insulate the electrode for detection 58 from the base member 70. Therefore, as shown in FIG. 5, the electrode for detection 58 is held on an insulating receiving section 59 (a diagonal line portion) made of plastics or the like, for example, and the receiving section 59 with the electrode for detection 58 held thereon is mounted on the base member 70. That is, by providing the insulating receiving section 59 between the base member 70 of a ground potential and the electrode for detection 58 of a high potential, the electrode for detection 58 is insulated from the base member 70. By doing so, an electric current can be prevented from flowing from the electrode for detection 58 to the base member 70, so that it is possible to keep the electrode for detection 58 and the base member 70 at the respective potentials.

Hereinafter, other members constituting the dot omission detection unit 50 will be explained. First, the high-voltage power supply unit 51 is one kind of power supply which provides the electrode for detection 58 with a given potential. The high-voltage power supply unit 51 in this embodiment is constituted by a direct-current power supply in the order of 600 V to 1 kV, and an operation thereof is controlled by a control signal from the detection control section 57.

The first limiting resistor 52 and the second limiting resistor 53 are disposed between an output terminal of the high-voltage power supply unit 51 and the electrode for detection 58, thereby limiting an electric current which flows between the high-voltage power supply unit 51 and the electrode for detection 58. In this embodiment, the first limiting resistor 52 and the second limiting resistor 53 have the same resistance value (for example, 1.6 MΩ) and are connected in series. As shown in the drawing, one end of the first limiting resistor 52 is connected to the output terminal of the high-voltage power supply unit 51 and the other end is connected to one end of the second limiting resistor 53. The other end of the second limiting resistor 53 is connected to the electrode for detection 58.

The capacitor for detection 54 is an element for extracting a potential change component of the electrode for detection 58, and is connected at a conductor on one side thereof to the electrode for detection 58 and at a conductor on the other side to the amplifier 55. By interposing the capacitor for detection 54 between the electrode for detection 58 and the amplifier 55, it is possible to remove a bias component (a direct-current component) of the electrode for detection 58, so that it is possible to facilitate the handling of a signal. In this embodiment, the capacitor for detection 54 has capacity of 4700 pF.

The amplifier 55 amplifies and outputs a signal (a change in potential) which appears at the other end of the capacitor for detection 54. The amplifier 55 in this embodiment is constituted by an amplifier having an amplification factor of 4000 times. By this, a potential change component can be acquired as a voltage signal having a voltage change in the range of 2 V to 3 V. A set of the capacitor for detection 54 and the amplifier 55 is equivalent to one kind of a detection section and detects a change in potential of the electrode for detection 58 which occurs due to the discharging of ink droplets.

The smoothing capacitor 56 suppresses a rapid change in potential. The smoothing capacitor 56 in this embodiment is connected at one end thereof to a signal line which connects the first limiting resistor 52 and the second limiting resistor 53 and at the other end to the ground. Then, capacity thereof is 0.1 μF.

The detection control section 57 (equivalent to an inspection section) is a section which performs control of the dot omission detection unit 50. As shown in FIG. 4B, the detection control section 57 includes a register group 57*a*, an AD conversion section 57*b*, a voltage comparison section 57*c*, and a control signal output section 57*d*. The register group 57*a* is constituted by a plurality of registers. In each register, a decision result of every nozzle, a voltage threshold for a decision, or the like is stored. The AD conversion section 57*b* converts a voltage signal (an analog value) after amplification, which is output from the amplifier 55, into the digital value. The voltage comparison section 57*c* compares a magnitude of the amplitude value with a voltage threshold on the basis of the voltage signal after amplification. The control signal output section 57*d* outputs a control signal for controlling an operation of the high-voltage power supply unit 51.

Concerning Discharge Inspection Method

Next, a discharge inspection method will be explained. In the printer 1 of this embodiment, as shown in FIG. 4A, the nozzle plate 32 is connected to the ground, thereby having a ground potential (equivalent to a first potential), and the electrode for detection 58 has a high potential (equivalent to a second potential) in the order of 600 V to 1 kV. In addition, an ink solvent in this embodiment is liquid (for example, water) having an electrically-conductive property, and ink droplets which are discharged from the nozzle have the ground potential due to the nozzle plate 32 with the ground potential. Then, each head 31 (the nozzle plate 32) and the electrode for detection 58 corresponding to each head 31 are disposed so as to face each other in a state where they are spaced by the predetermined interval d, and then ink droplets are discharged from a nozzle which is a detection object. Then, the detection control section 57 acquires an electrical change (a change in potential) induced at one side of the electrode for detection 58 due to the discharging of the ink droplets as a voltage signal SG via the capacitor for detection 54 and the amplifier 55. The detection control section 57 determines whether or not ink droplets have been normally discharged from the nozzle, which is the detection object, on the basis of the amplitude value (a change in potential) in the voltage signal SG.

Although the principle of detection has not been precisely clarified, it is considered to be because, by disposing the nozzle plate 32 and the electrode for detection 58 at the predetermined interval d, a configuration in which these members act just like a capacitor can be made. As shown in FIG. 4A, ink (an ink column) elongated in a columnar shape from the nozzle also has the ground potential due to the contact thereof with the nozzle plate 32 connected to the ground. It is considered that the elongation of ink changes the capacitance value in the capacitor. That is, by the discharging of ink from the nozzle, the ink having the ground potential and the electrode for detection 58 constitute a capacitor and the capacitance is changed.

Then, if the capacitance becomes smaller, the amount of electric charge which can be stored between the nozzle plate 32 and the electrode for detection 58 is reduced. Therefore, surplus electric charge moves from the electrode for detection 58 to the high-voltage power supply unit 51 through each of the limiting resistors 52 and 53. That is, an electric current flows toward the high-voltage power supply unit 51. On the other hand, if the increased or decreased capacitance is recovered, electric charge moves from the high-voltage power supply unit 51 to the electrode for detection 58 through the limiting resistors 52 and 53. That is, an electric current flows toward the electrode for detection 58. Once such an electric current (for convenience's sake, it is also referred to as an electric current for discharge inspection, If) flows, a potential of the electrode for detection 58 varies. A change in potential of the electrode for detection 58 appears also as a change in potential of a conductor on the other side in the capacitor for detection 54 (a conductor on the side of the amplifier 55). Accordingly, by monitoring a change in potential of the conductor on the other side, whether or not ink droplets have been discharged can be determined.

Figure 6A:
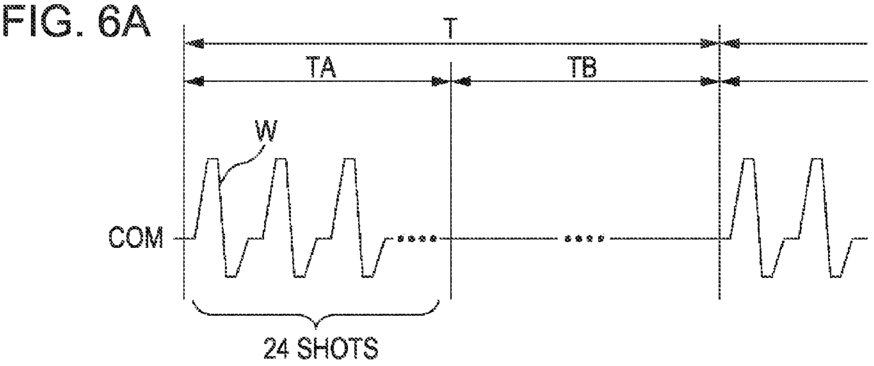
FIG. 6A is a diagram showing a driving signal which is used at the time of discharge inspection.
Figure 6B:
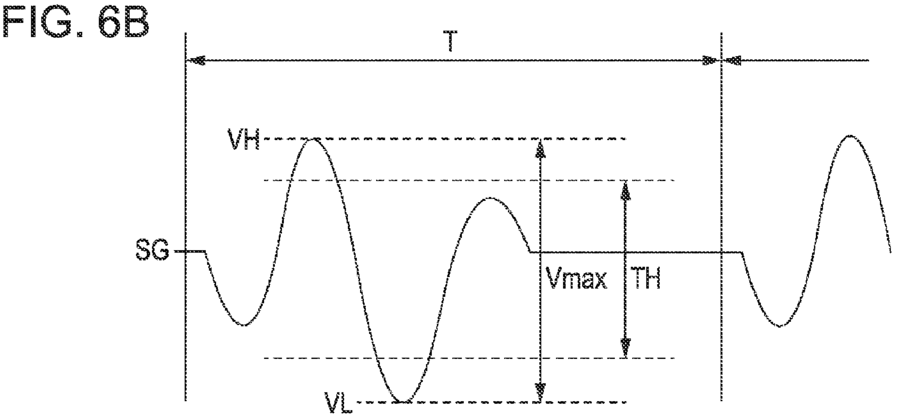
FIG. 6B is a diagram explaining a voltage signal.
Figure 6C:
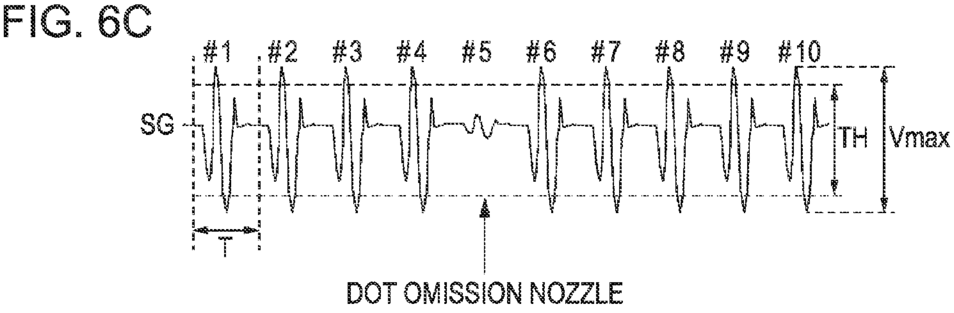
FIG. 6C is a diagram showing discharge inspection results of a plurality of nozzles.

FIG. 6A is a diagram showing one example of the driving signal COM which is used at the time of the discharge inspection, FIG. 6B is a diagram explaining the voltage signal SG which is output from the amplifier 55 in a case where ink has been discharged from the nozzle by the driving signal COM of FIG. 6A, and FIG. 6C is a diagram showing the voltage signal SG which is the discharge inspection results of a plurality of nozzles (#1 to #10). The driving signal COM has a plurality of driving waveforms W (for example, twenty four) due to the discharging of ink from the nozzle in a first-half period TA during a repetition period T, and a constant potential at an intermediate potential is kept in a second-half period TB. The driving signal generation circuit 40 generates repetitively the driving signal COM for every repetition period T. The repetition period T is equivalent to a time required for inspection of one nozzle.

First, the driving signal COM is applied to a piezoelectric device corresponding to a certain nozzle among the inspection objects over the repetition period T. Then, ink droplets are continuously discharged from the nozzle of the discharge inspection object in the first-half period TA (for example, 24 shots are provided). By this, a potential of the electrode for detection 58 varies and the amplifier 55 outputs the change in potential to the detection control section 57 as the voltage signal SG (a sine curve) shown in FIG. 6B. In addition, since a change in potential of the electrode for detection 58 by an ink droplet for one shot is too small, by continuously discharging ink droplets from the nozzle the voltage signal SG having amplitude sufficient for inspection is obtained.

The detection control section 57 calculates maximum amplitude Vmax (a difference between a highest voltage VH and a lowest voltage VL) from the voltage signal SG of the inspection period (T) for the inspection object nozzle and compares the maximum amplitude Vmax with the predetermined threshold value TH. If ink is discharged from the nozzle of the inspection object in accordance with the driving signal COM, a potential of the electrode for detection 58 changes, so that the maximum amplitude Vmax of the voltage signal SG becomes larger than the threshold value TH. On the other hand, if ink is not discharged from the nozzle of the inspection object due to clogging or the like or the amount of discharged ink becomes smaller, a potential of the electrode for detection 58 does not change or its change becomes smaller, so that the maximum amplitude Vmax of the voltage signal SG becomes equal to or smaller than the threshold value TH.

The driving signal COM is applied to a corresponding piezo element for every repetition period T and for every nozzle in such a manner that after the application of the driving signal COM to a piezo element corresponding to a certain nozzle the driving signal COM is applied to a piezo element corresponding to the next inspection object nozzle over the repetition period T. As a result, the detection control section 57 can acquire the voltage signal SG, in which a change in potential of a sine curve (FIG. 6B) is generated, for every repetition period T, as shown in FIG. 6C. For example, in the results in FIG. 6C, since the maximum amplitude of the voltage signal SG corresponding to the inspection period of the nozzle #5 is smaller than the threshold value TH, the detection control section 57 determines that the nozzle #5 is a dot omission nozzle. Since the maximum amplitude Vmax of the voltage signal SG corresponding to each inspection period of other nozzles (#1 to #4 and #6 to #10) is equal to or larger than the threshold value TH, the detection control section 57 estimates that these other nozzles are normal nozzles. Thus, in a case where a dot omission nozzle is detected in the discharge inspection, the controller 10 of the printer 1 carries out the recovery operation. By doing so, it is possible to print a high-quality image having no dot omission.

Concerning the Receiving Section 59 for the Electrode for Detection 58

As described above (FIG. 5), since the electrode for detection 58 having a high potential at the time of discharge inspection is mounted on the base member 70 (the shield plate) having the ground potential, the insulating receiving section 59 is provided between the electrode for detection 58 and the base member 70. By doing so, the flow (short-circuit) of an electric current between the electrode for detection 58 and the base member 70 can be prevented. Accordingly, the base member 70 can be kept at the ground potential, thereby being safe, and also during the discharge inspection the electrode for detection 58 can be kept at a predetermined high potential. By keeping the electrode for detection 58 at a predetermined high potential, the amplitude (FIG. 6B) of the voltage signal SG sufficient for the inspection can be obtained, so that it is possible to precisely perform the discharge inspection. Hereinafter, after explanation of a receiving section 59' of a comparative example, the receiving section 59 in this embodiment will be explained in detail.

Concerning the Receiving Section 59' of Comparative Example

Figure 7A:
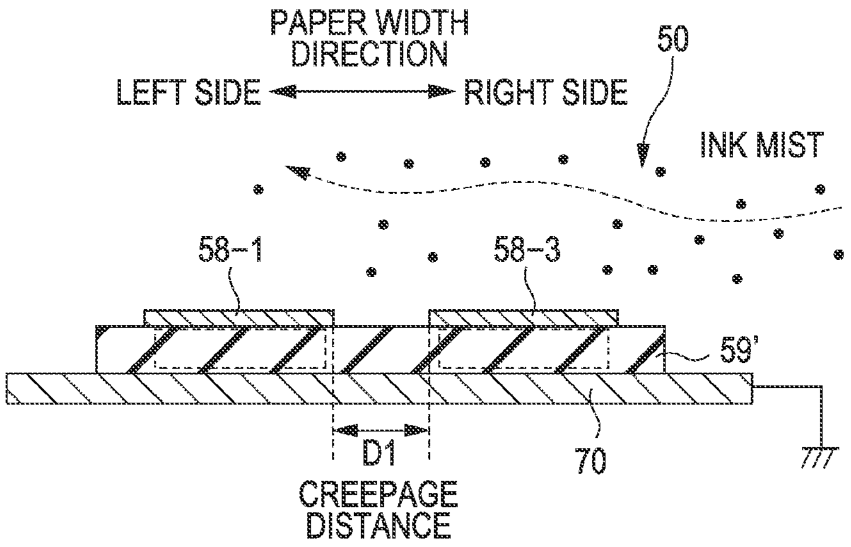
Figure 7B:
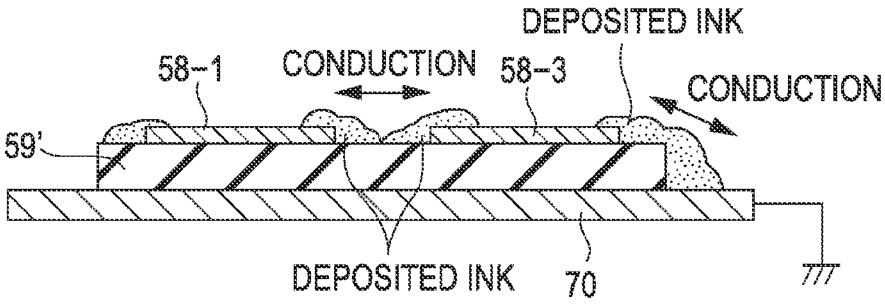

FIG. 7A is a cross-sectional view of the receiving section 59' of the comparative example, and FIG. 7B is a diagram showing a state in which ink is deposited on the electrodes for detection 58 and the like. In addition, in the following, for simplification of explanation, only two electrodes for detection 58-1 and 58-3 are shown which are lined up in the paper width direction. Also, the electrode for detection 58-1 on the left side in the paper width direction is called a "first electrode for detection" and the electrode for detection 58-3 on the right side in the paper width direction is called a "third electrode for detection". The receiving section 59' of the comparative example is an insulating member (for example, plastic) of a rectangular parallelepiped shape, and all the electrodes for detection 58-1 and 58-3 are disposed on the receiving section 59' of the comparative example. That is, in comparative example, one receiving section 59' is provided with respect to a plurality of electrodes for detection 58.

On the other hand, when discharging ink from the nozzle, minute ink droplets are discharged along with a main ink droplet. The minute ink droplets are sometimes suspended in the inside of the printer 1 as ink mist without landing on the medium, etc. Then, as shown in FIG. 7A, the ink mist generated at a printing area are suspended up to the dot omission detection unit 50 of a non-printing area, thereby being attached to the electrode for detection 58 and the like. Also, the minute ink droplets are generated also at the time of the discharge inspection, thereby being attached to the electrode for detection 58 and the like. As a result, as the time of use of the printer 1 elapses, ink is deposited on each member, as shown in FIG. 7B.

In FIG. 7B, ink deposited on the first electrode for detection 58-1 and ink deposited on the third electrode for detection 58-3 come into contact with each other and ink is also deposited over an area from the third electrode for detection 58-3 to the base member 70. That is, the first electrode for detection 58-1 is connected to the third electrode for detection 58-3 through ink, and the third electrode for detection 58-3 is connected to the base member 70 through ink. Also, an ink solvent in this embodiment is liquid (for example, water) having an electrically-conductive property. Accordingly, the first electrode for detection 58-1 is conductively connected to the third electrode for detection 58-3 through ink.

Also, in the comparative example, treatment is not carried out on the surface of the base member 70, so that the surface (the upper surface) of the base member 70 has an electrically-conductive property. Accordingly, as shown in FIG. 7B, once ink deposited on the upper surface of the base member 70 and ink deposited on the electrodes for detection 58 come into contact with each other, the base member 70 and the electrodes for detection 58 are conductively connected to each other.

As a result, the electrodes for detection 58, which are conductively connected to each other through ink, mutually affect each other at the time of the discharge inspection, the result being that it is not possible to precisely perform the discharge inspection due to occurrence of noise on a discharge inspection result (the voltage signal SG) or the like. Also, at the time of the discharge inspection, an electric current flows from the electrode for detection 58 to the base member 70 which is conductively connected thereto, so that a potential of the electrode for detection 58 becomes a potential lower than a predetermined potential. Then, the amplitude of the voltage signal SG becomes smaller, the result being that it is not possible to precisely estimate whether or not there is discharging from the nozzle. Also, there is a possibility of danger that an electric current flows to the base member 70.

In particular, in the printer 1 of this embodiment, in order to shorten discharge inspection time, the electrode for detection 58 is provided for each head 31 and the electrodes for detection 58 are mounted on the base member 70 in the same way as the arrangement of the heads 31 in the head unit 30 (FIG. 3A). Accordingly, a plurality of electrodes for detection 58 is located at relatively close distances. As shown in FIG. 5, a distance D1 in the paper width direction between the electrodes for detection (for example, 58-1 and 58-3) adjacent to each other in the paper width direction is narrow and a distance D2 in the transport direction between the electrodes for detection (for example, 58-14 and 58-15) adjacent to each other in the transport direction is narrow.

Then, ink mist is attached to the surface of the electrode for detection 58, the receiving section 59, or the like. In the comparative example, since a plurality of electrodes for detection 58 is located on the receiving section 59' of a rectangular parallelepiped shape, for example, as shown in FIG. 7A, the length (the length in the paper width direction) of the surface of the receiving section 59', in which ink can be attached thereto, between the first electrode for detection 58-1 and the third electrode for detection 58-3 is a distance (a horizontal distance) "D1" in the paper width direction between two electrodes for detection 58 and is relatively short. In other words, a distance in which ink which is deposited on the first electrode for detection 58-1 comes into contact with ink which is deposited on the third electrode for detection 58-3 is the distance "D1" in the paper width direction between two electrodes for detection 58 and is relatively short. Accordingly, in the comparative example, ink deposited on each of two electrodes for detection 58-1 and 58-3 easily comes into contact with each other, so that it is easy for two electrodes for detection to be conductively connected to each other.

Summarizing the aforementioned, in the dot omission detection unit 50 of the printer 1 having a plurality of heads 31, in a case where the electrode for detection 58 is provided for each head 31 and the electrodes for detection 58 are disposed in the same way as the arrangement of the heads 31, the distance between the electrodes for detection 58 is relatively close, so that there is a danger that the electrodes for detection 58 will be conductively connected to each other through ink deposited on each electrode for detection 58. Also, in the dot omission detection unit 50 in which the electrodes for detection 58 are mounted on the base member 70 (the shield plate) made of a metal plate with the insulating receiving section 59 interposed therebetween, there is a danger that ink deposited on the electrode for detection 58 and ink deposited on the base member 70 come into contact with each other so that the electrode for detection 58 is conductively connected to the base member 70. Then, the result is that it is not possible to precisely perform the discharge inspection.

Therefore, in this embodiment, an object is to perform the discharge inspection as precisely as possible by preventing the conductive connection of the electrodes for detection 58 to each other through ink, or the conductive connection of the electrode for detection 58 and the base member 70 to each other through ink.

The receiving section 59 in this embodiment:

Example 1

Figure 8A:
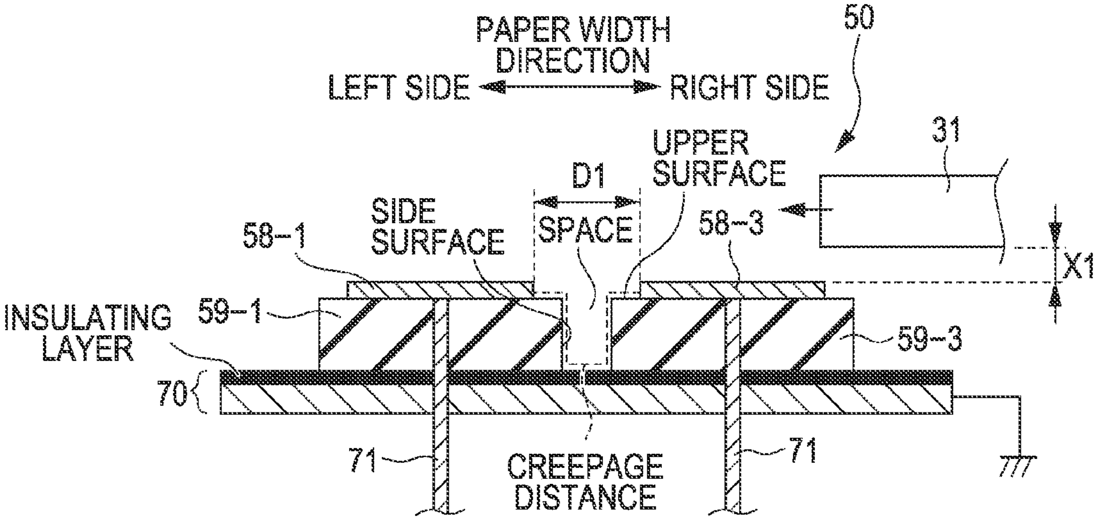
FIG. 8A is a cross-sectional view of a receiving section of Example 1 and FIG. 8B is a diagram showing a state in which ink is deposited on the receiving section of Example 1.
Figure 8B:
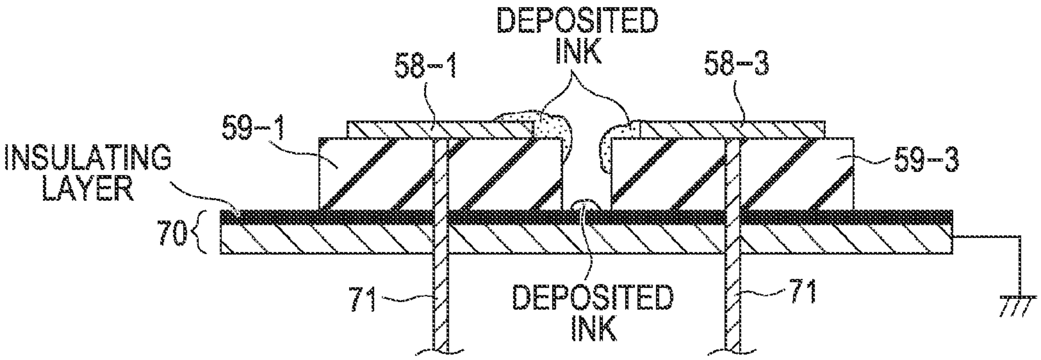

FIG. 8A is a cross-sectional view of the receiving section 59 of Example 1 and FIG. 8B is a diagram showing a state in which ink is deposited on the receiving section 59 of the Example 1. In this embodiment, as shown in FIG. 5, the insulating receiving section 59 (for example, plastic or the like) is provided for each electrode for detection 58. Each electrode for detection 58 is held on the individual receiving section 59 and mounted on the base member 70. Then, the receiving section 59 of Example 1, which corresponds to each electrode for detection 58, is approximately of a rectangular parallelepiped shape. In addition, for explanation, the receiving section 59-1 which holds the first electrode for detection 58-1 is called a "first receiving section", and the receiving section 59-3 which holds the third electrode for detection 58-3 is called a "third receiving section". Then, in this embodiment, as shown in FIG. 5 and FIG. 8A, a "space" is provided between each receiving section 59 which holds the electrodes for detection 58 adjacent to each other in the paper width direction and the transport direction.

It is possible to increase a "creepage distance" between the electrodes for detection 58 by disposing the first receiving section 59-1 and the third receiving section 59-3 with a "space" interposed therebetween. The "creepage distance" between the electrodes for detection 58 is the total length of surfaces (the surface of the receiving section 59 and the surface of the base member 70) from a given electrode for detection 58 to the neighboring electrodes for detection 58. In FIG. 8A, the length of the creepage distance between the first electrode for detection 58-1 and the third electrode for detection 58-3 is represented by a dotted line. Specifically, in FIG. 8A, the length of the creepage distance corresponds to the length added up the length of the upper surface of the first receiving section 59-1 from the right end of the first electrode for detection 58-1 to the right end of the first receiving section 59-1, the length of the right side surface of the first receiving section 59-1, the length of the base member 70 between the first receiving section 59-1 and the third receiving section 59-3, the length of the left side surface of the third receiving section 59-3, and the length of the upper surface of the third receiving section 59-3 from the left end of the third receiving section 59-3 to the left end of the third electrode for detection 58-3. On the other hand, in the above-described comparative example (FIG. 7A), the length of the creepage distance between the first electrode for detection 58-1 and the third electrode for detection 58-3 corresponds to the length "D1" in the paper width direction from the right end of the first electrode for detection 58-1 to the left end of the third electrode for detection 58-3. That is, the creepage distance of Example 1 (FIG. 8A) is longer than the creepage distance D1 of the comparative example (FIG. 7A) by the lengths of two side surfaces of the receiving sections 59 of Example 1. This is because the "space" is provided between the first receiving section 59-1 and the third receiving section 59-3.

Then, ink mist which is suspended in the inside of the printer 1 is attached to the surface of the base member. Therefore, the longer the creepage distance between two electrodes for detection 58, the wider the surface area of the base member, to which ink mist can be attached. As a result, it becomes difficult for ink deposited at each of the two electrodes for detection 58 to come into contact with each other. For example, in the comparative example (FIG. 7A), ink deposited on the first electrode for detection 58-1 comes into contact with ink deposited on the third electrode for detection 58-3. On the other hand, in a case where ink comparable with that in the comparative example is deposited, in Example 1 (FIG. 8B), ink deposited on the respective electrodes for detection 58-1 and 58-3 reaches the side surface of each of the receiving sections 59-1 and 59-3, but does not come into contact with each other. In Example 1, in order for ink deposited on the respective electrodes for detection 58-1 and 58-3 to come into contact with each other, ink needs to be deposited over the side surfaces of two receiving sections 59-1 and 59-3 and the base member 70 between two receiving sections 59-1 and 59-3.

That is, by providing the "space" between the receiving sections 59 of the respective electrodes for detection 58, thereby lengthening the "creepage distance" between the electrodes for detection 58, it is possible to make it difficult for ink deposited on the respective electrodes for detection 58 to be connected to each other so that the conductive connection between the electrodes for detection 58 through ink can be suppressed. As a result, noise or the like can be prevented from being generated at the voltage signal SG (a discharge inspection result) due to the adjacent electrodes for detection 58 mutually affecting each other, so that it is possible to precisely carry out the discharge inspection. Also, in other words, by lengthening the "creepage distance" between the electrodes for detection 58, a long time can be secured until ink deposited on the respective electrodes for detection 58 is connected to each other, so that it is possible to reduce the number of times maintenance such as cleaning of the deposited ink is carried out.

In addition, by increasing the height of the receiving section 59 (by lengthening the length of the side surface), it is possible to lengthen the creepage distance between the electrodes for detection 58. However, the electrode for detection 58 is disposed so as to face the head 31 (the nozzle face) at the time of the discharge inspection and the height of the head 31 is already established. Therefore, in FIG. 8A, the height of the receiving section 59 is determined such that a predetermined distance X1 in space is provided between the nozzle face and the electrode for detection 58.

Also, in Example 1, an insulation treatment is carried out on the upper surface of the base member 70. Here, an alumite treatment is carried out on the base member (an oxide coating is applied to a base material of aluminum). However, it is not limited to this, but, for example, a resin coating may also be applied to the surface of the base member 70. In FIGS. 8A and 8B, a portion where the insulation treatment is carried out on the base member 70 is shown in black as an insulating layer. By doing so, even if ink deposited on the upper surface of the base member 70 between two receiving sections 59-1 and 59-3 and ink deposited on the electrode for detection 58 come into contact with each other, the conductive connection of the electrode for detection 58 and the base member 70 to each other can be prevented. As a result, it is possible to keep the electrode for detection 58 at the predetermined high potential at the time of the discharge inspection, so that it is possible to precisely carry out the discharge inspection. Also, it is safe because it is possible to keep the base member 70 at the ground potential. In addition, here, since a structure is made in which deposited ink does not flow from the electrode for detection 58 up to the side surface or the backside surface of the base member 70, the insulation treatment is carried out only on the exterior surface (the upper surface) which comes into contact with the receiving section 59, among surfaces of the base member 70. However, it is not limited to this, but, for example, the insulation treatment may also be carried out on the entire surfaces of the base member 70.

Also, in Example 1, as shown in FIG. 8A, a signal line 71 (the voltage signal SG in FIG. 6B) connected to the electrode for detection 58 penetrates the inside of the receiving section 59 and the base member 70. By doing so, even in a case where a number of electrodes for detection 58 are provided like the dot omission detection unit 50 in this embodiment, it is possible to easily perform a wiring treatment. Also, if the signal line 71 is located in a space between the receiving sections 59 without penetrating the receiving section 59 and the base member 70, there is a danger that ink mist is deposited on the signal line 71, so that ink deposited on each of the adjacent electrodes for detection 58 comes into contact with each other through ink deposited on the signal line 71. That is, by making the signal line 71 penetrate the inside of the receiving section 59 and the base member 70, it is possible to easily perform the wiring treatment and also to prevent from being easily conductively connected between the adjacent electrodes for detection 59 through the ink on the signal line 71. However, it is not limited to this. The signal line 71 may also penetrate either of the receiving section 59 or the base member 70 or the signal line 71 may not penetrate the receiving section 59 or the base member 70.

The receiving section 59 in this embodiment:

Example 2

Figure 9A:
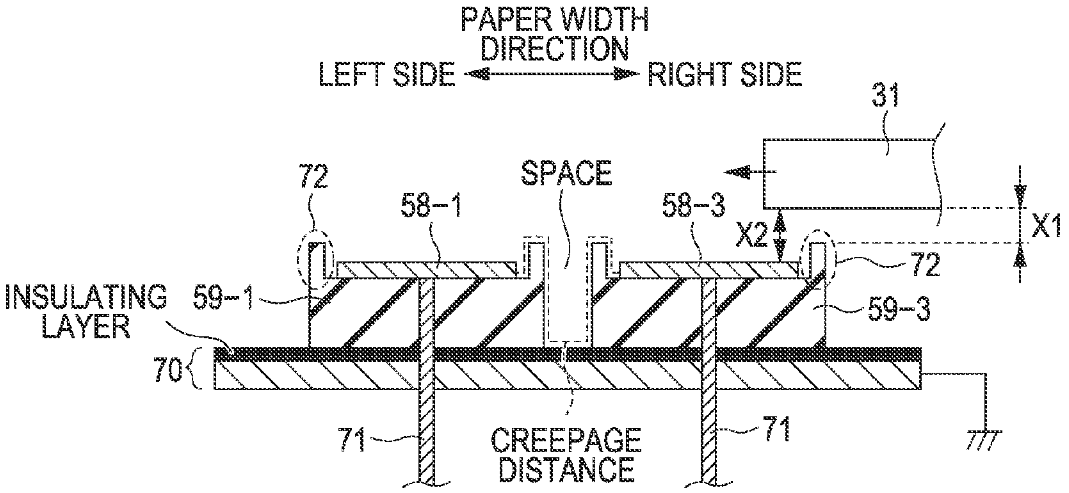
FIG. 9A is a cross-sectional view of a receiving section of Example 2 and FIG. 9B is a top view of the receiving section of Example 1.
Figure 9B:
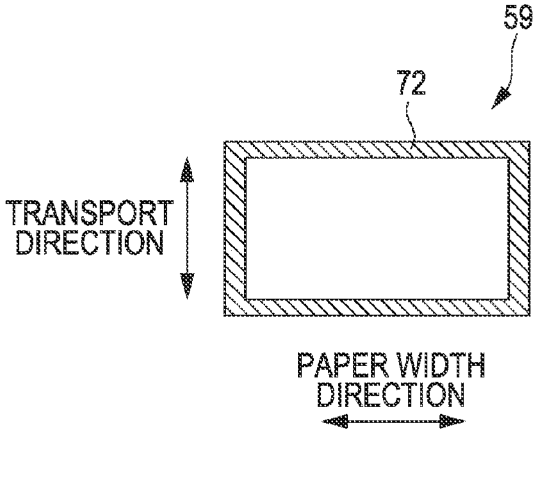

FIG. 9A is a cross-sectional view of the receiving section 59 of Example 2 and FIG. 9B is a top view of the receiving section 59 of Example 2. In the receiving section 59 of Example 2, end edges of the upper surface of the receiving section 59 protrude upward against the central region on the upper surface of the receiving section 59. A portion where the end edge of the upper surface of the receiving section 59 protrudes is called a "protrusion portion 72". In the top view of FIG. 9B, a portion represented by hatched lines in the receiving section 59 is shown as the protrusion portion 72, and here, the surrounding end edges of the upper surface of the receiving section 59 protrude. In other words, on the upper surface of the receiving section 59, not only the end edges along the paper width direction, but also the end edges along the transport direction protrude upward. However, it is not limited to this, but, for example, among the surrounding end edges (four end edges) of the upper surface of the receiving section 59, only the end edge facing another receiving section 59 (the end edge on the space side) may also be made so as to protrude.

By providing the protrusion portion 72 at the receiving section 59 in this manner, compared to the receiving section 59 (FIG. 8A) of Example 1 having no protrusion portion 72, it is possible to increase the creepage distance between the electrodes for detection 58 by lengths corresponding to the side surfaces of the protrusion portion 72. By further lengthening the creepage distance between the electrodes for detection 58, it is possible to make it more difficult for ink deposited on the respective electrodes for detection 58 to be connected to each other. That is, the conductive connection of the adjacent electrodes for detection 58 to each other can be prevented, so that it is possible to precisely carry out the discharge inspection.

Also, since the height position of the head 31 is already established, in FIG. 9A, the height of the protrusion portion 72 is determined such that a predetermined distance X1 (a first distance X1) is a distance in space between the nozzle face and the upper surface of the protrusion portion 72. In such a receiving section 59 of Example 2, a distance X2 (a second distance X2) between the electrode for detection 58 and the nozzle face is longer than the distance X1. On the other hand, in Example 1 (FIG. 8A) described above, in order to lengthen the creepage distance between the electrodes for detection 58, the side surface of the receiving section 59 is made as high as possible, and the distance between the electrode for detection 58 and the nozzle face is set to be the first distance X1. That is, in Example 2, since the protrusion portion 72 is provided, the distance (the second distance X2) between the electrode for detection 58 and the nozzle face in Example 2 is longer than the distance (the first distance X1) between the electrode for detection 58 and the nozzle face in Example 1.

It is preferable that the distance between the electrode for detection 58 and the nozzle face be large as far as possible in a range in which the discharge inspection is possible. This is because, if the distance between the nozzle face and the electrode for detection 58 is small, there is a danger that ink deposited on the upper side of the electrode for detection 58 and the nozzle face will come into contact with each other.

Then, in the discharge inspection of this embodiment, as shown in FIG. 4A, since the nozzle face 32 is set to have the ground potential and the electrode for detection 58 is set to have the predetermined high potential, the nozzle face 32 and the electrode for detection 58 are conductively connected to each other through deposited ink, the result being that it is not possible to carry out precisely the discharge inspection. That is, in Example 2, by providing the protrusion portion 72, it is possible to enlarge the distance X2 between the nozzle face and the electrodes for detection 58 while the creepage distance between the electrodes for detection 58 is becoming larger. As a result, the conduction between the electrodes for detection 58 or the conduction between the electrode for detection 58 and the nozzle face is prevented.

The receiving section 59 in this embodiment:

Example 3

Figure 10A:
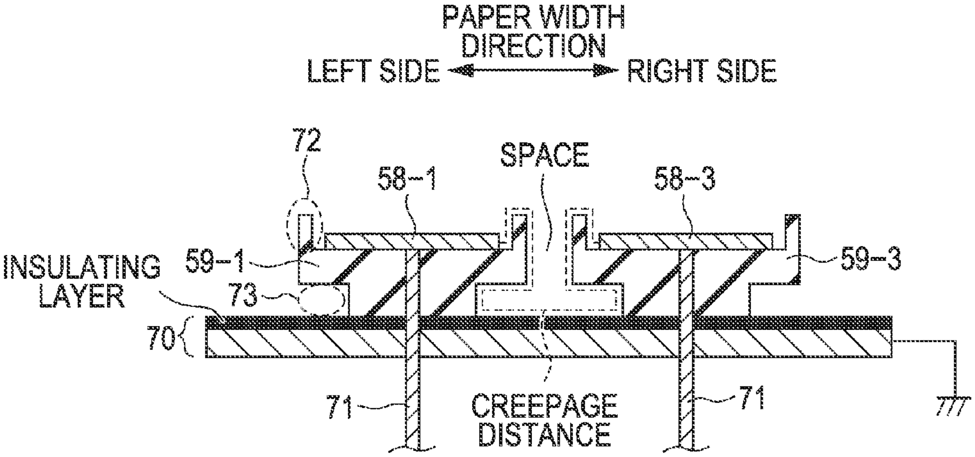
FIG. 10A is a cross-sectional view of a receiving section of Example 3 and FIG. 10B is a diagram showing a state in which ink is deposited on the receiving section of Example 3.
Figure 10B:
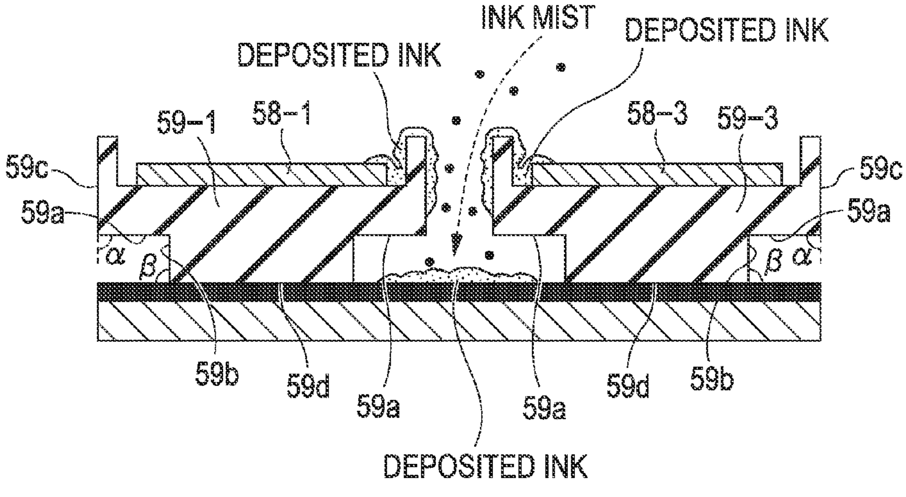

FIG. 10A is a cross-sectional view of the receiving section 59 of Example 3 and FIG. 10B is a diagram showing a state in which ink is deposited on the receiving section 59 of Example 3. A cutout portion 73 is provided at the lower portion of the receiving section 59 of Example 3, so that a space is provided at the lower portion of the receiving section 59. In addition, in FIGS. 10A and 10B, a state is shown in which the cutout portions 73 are provided at the left and right side surfaces in the paper width direction in the receiving section 59. However, the cutout portions 73 are also provided at the side surfaces on the upstream side and the downstream side in the transport direction in the receiving section 59.

The cutout portion 73 shown here has a surface (a cutout ceiling surface 59*a*) which forms a 90 degree angle (an angle α) with respect to a side surface 59*c* of the receiving section 59 and a surface (a cutout side surface 59*b*) which forms a 90 degree angle (an angle β) with respect to a bottom surface 59*d* of the receiving section 59, as shown in FIG. 10B. By providing the cutout portion 73 at the lower portion of the receiving section 59 in this manner, it is possible to increase the creepage distance between the electrodes for detection 58 by the lengths of the surfaces (the cutout ceiling surface 59*a* and the cutout side surface 59*b*) which forms the cutout portion 73. As a result, it is possible to make it more difficult for ink deposited on the respective electrodes for detection 58 to be connected to each other, so that the conduction between the electrodes for detection 58 is prevented, whereby it is possible to precisely carry out the discharge inspection.

In addition, in order to make the creepage distance long, it is preferable to lengthen the length of the surface that the cutout portion 73 has, for example, the cutout ceiling surface 59*a*. However, if the cutout ceiling surface 59*a* is too long, the lower portion of the receiving section 59 becomes too small compared to the upper portion of the receiving section 59, so that a sense of stability of the receiving section 59 becomes worse. Therefore, for example, it is preferable that the cutout ceiling surface 59*a* is located to extend further up to the inside than the end portion of the electrode for detection 58, and the length of the cutout ceiling surface 59*a* is made long to the extent that a sense of stability of the receiving section 59 can be maintained.

Also, as shown in FIG. 10B, ink mist entered into the space between two receiving sections 59 falls due to the force of gravity. Therefore, the ink mist is easily deposited on the upper surface of the base member 70 between two receiving sections 59. Also, it is difficult for the ink mist entered into the space between two receiving sections 59 to turn toward and to be attached to the cutout ceiling surface 59*a* of the cutout portion 73. The fact that ink is not deposited on the cutout ceiling surface 59*a* of the cutout portion 73 means that ink deposited on the first electrode for detection 58-1, for example, may be connected to ink on the side surface of the first receiving section 59-1, but not connected to ink deposited on the upper surface of the base member 70 or on the third electrode for detection 58-3. That is, by providing the cutout portion 73 at the receiving section 59, it is possible to form a surface (the cutout ceiling surface 59*a*) difficult for ink to be deposited in a creepage surface (the surface of the receiving section 59 or the base member 70) between two electrodes for detection 58, so that conductive connection of the two electrodes for detection 58 to each other through ink can be prevented. As a result, it is possible to precisely carry out the discharge inspection.

In the same way, by providing the cutout portion 73 at the receiving section 59, it is possible to form surfaces (the cutout ceiling surface 59*a*) difficult for ink to be deposited in a creepage surface (the side surface of the receiving section 59) between the electrode for detection 58 and the base member 70. Accordingly, the conductive connection of the electrode for detection 58 and the base member 70 to each other through ink can be prevented. Therefore, in a case where the cutout portion 73 is provided at the receiving section 59, even if the insulation treatment is not carried out on the surface (the upper surface) of the base member 70, the conductive connection of the electrode for detection 58 and the base member 70 to each other through ink can be prevented.

In addition, in FIGS. 10A and 10B, the receiving section 59 provided with the cutout portion 73 and the protrusion portion 72 is taken as an example. However, it is not limited to this, but the receiving section 59 having only the cutout portion 73 is also acceptable. Also, a disposition position of the cutout portion 73 is not limited to the lower portion of the receiving section 59 (that is, the cutout portion is not limited to the cut away including the bottom surface 59*d* of the receiving section 59), but the cutout portion 73 may also be provided at the central portion of the side surface of the receiving section 59.

Concerning Modified Examples of Example 3

Figure 11A:
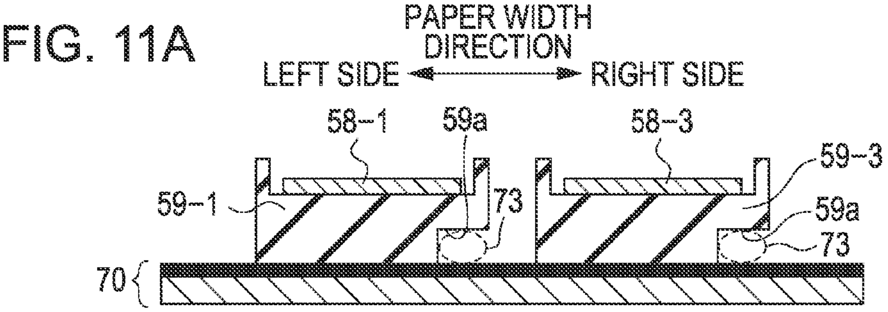
FIGS. 11A to 11E are diagrams showing modified examples of a cutout portion which is provided at the receiving section.

FIGS. 11A to 11E are diagrams showing modified examples of the cutout portion 73 which is provided at the receiving section 59. The invention is not limited to a configuration in which the cutout portions 73 are provided at all the side surfaces of the receiving section 59, but, for example, as shown in FIG. 11A, the cutout portion 73 may also be provided only at one side surface among the left and right side surfaces in the paper width direction of the receiving section 59. In this case, when disposing the receiving sections 59 in the paper width direction, the receiving sections 59 are disposed such that the side surfaces having the cutout portion 73 are located on the same side (such that each cutout portion 73 is located on the right side in FIG. 11A). By doing so, since the cutout ceiling surface 59*a*, in which it is difficult for ink to be deposited thereon, is necessarily located between the receiving sections 59-1 and 59-3 adjacent to each other in the paper width direction, two electrodes for detection 58-1 and 58-3 can be prevented from being connected to each other through ink. In the same way, the cutout portion 73 may also be provided only at one side surface among the side surfaces on the upstream side and the downstream side in the transport direction in the receiving section 59 (this example is not shown in the drawing). That is, it is preferable if the cutout portion 73 is provided at the side surface (the side surface on the space side) facing another receiving section 59.

Figure 11B:
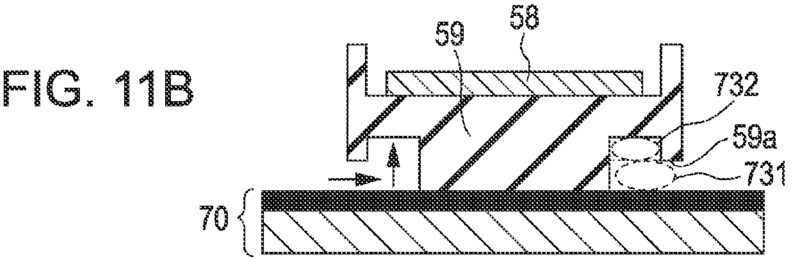

FIG. 11B is a diagram showing the receiving section 59 in which a two-stepped cutout portion 73 is provided. The two-stepped cutout portion 73 is a cutout portion having a first cutout portion 731 cut away in the horizontal direction (the paper width direction) with respect to the side surface of the receiving section 59 and a second cutout portion 732 (another cutout portion) formed by cutting away a ceiling surface 59*a* of the first cutout portion 731 upward in the vertical direction. By providing the two-stepped cutout portion 73 at the receiving section 59 in this manner, it is possible to further lengthen the creepage distance between the electrodes for detection 58. Also, it is more difficult for ink mist to be attached to a ceiling surface of the second cutout portion 732, so that two electrodes for detection 58 can be more reliably prevented from being connected to each other through ink.

Figure 11C:
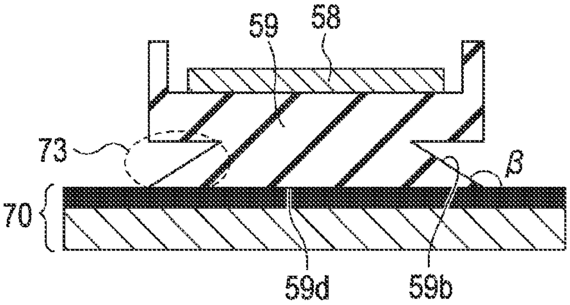
Figure 11D:
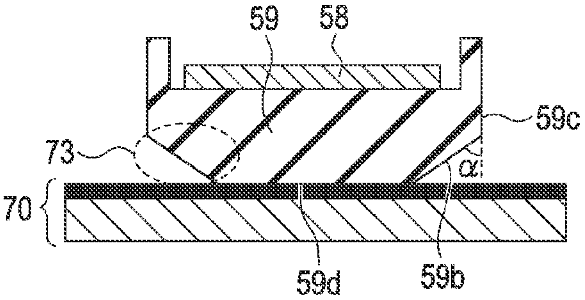

FIGS. 11C and 11D are diagrams showing the cutout portions 73 cut away obliquely with respect to the bottom surface 59*d* of the receiving section 59. FIG. 11C shows the cutout portion 73 in which the side surface 59*b* of the cutout portion 73 is inclined with respect to the bottom surface 59*d* of the receiving section 59 by making an angle β between the bottom surface 59*d* of the receiving section 59 and the side surface 59*b* of the cutout portion 73 larger than 90 degrees. On the other hand, FIG. 11D shows the cutout portion 73 in which the side surface 59*b* of the cutout portion 73 is inclined with respect to the bottom surface 59*d* of the receiving section 59 by making an angle α between the side surface 59*c* of the receiving section 59 and the side surface 59*b* of the cutout portion 73 smaller than 90 degrees. The cutout portion 73 cut away obliquely with respect to the bottom surface 59*d* of the receiving section 59 in this manner may also be provided. However, like the cutout portion 73 shown in FIG. 10B, the cutout portion 73 having the surface 59*a* which forms a 90 degree angle with respect to the side surface 59*c* of the receiving section 59 and having the surface 59*b* which forms a 90 degree angle with respect to the bottom surface 59*d* of the receiving section 59 can make the creepage distance between the electrodes for detection 58 longer.

Figure 11E:
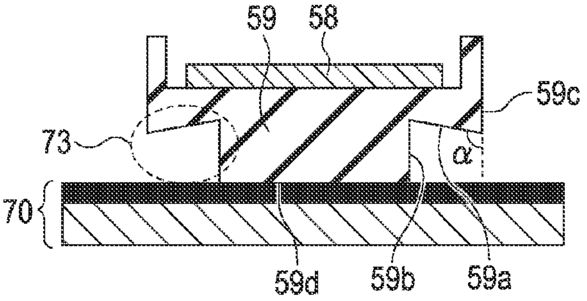

FIG. 11E is a diagram showing the receiving section 59 having the cutout portion 73 in which the cutout ceiling surface 59*a* is cut away upward. As shown in the drawing, the cutout portion 73 having a surface (the cutout ceiling surface 59*a*) which forms an angle (an angle α) larger than 90 degrees with respect to the side surface 59*c* of the receiving section 59 and a surface (the cutout side surface 59*b*) which forms a 90 degree angle (an angle β) with respect to the bottom surface 59*d* of the receiving section 59 is also acceptable. By cutting away upward the cutout ceiling surface 59*a* in this manner, it is possible to make it more difficult for ink mist to be attached thereto.

Other Embodiments

Each embodiment described above mainly describes a printing system including an ink jet type printer. However, the disclosure of a discharge inspection method and the like is included therein. Also, the above-described embodiments are for facilitating the understanding of the invention, but are not intended to construe the invention as being limited thereto. The invention can be modified or improved without departing from the purpose thereof, and it is also needless to say that the equivalents thereto are included in the invention. In particular, embodiments which are described below are also included in the invention.

Concerning the Receiving Section 59

In the above-described embodiments, as shown in FIG. 5 and the like, the receiving section 59 corresponding to each electrode for detection 58 is made as an individual object (it is separable). However, it is not limited to this. For example, a configuration is also acceptable in which a plurality of receiving sections 59 corresponding to a plurality of electrodes for detection 58 is made as an integrated object and, for example, the bottom surfaces of the respective receiving sections 59 are connected to each other. In addition, in the above-described embodiment (FIGS. 8A and 8B), the base member 70 is exposed between two receiving sections 59-1 and 59-3. However, it is possible to cover the base member 70 between two receiving sections 59 by an insulating substance (for example, plastic or the like) by connecting the bottom surfaces of the respective receiving sections 59 by the insulating substance. In this case, the insulation treatment of the upper surface (the face) of the base member 70 may not be carried out.

Concerning Discharge Inspection Apparatus

In the above-described embodiments, the discharge inspection apparatus (the dot omission detection unit 50) of the form which is mounted on the printer 1 is described. However, it is not limited to this configuration. It is also possible to configure the dot omission detection unit 50 as a dedicated discharge inspection apparatus for inspecting the head unit 30, for example.

Concerning the Printer

In the above-described embodiments, a printer (a so-called line head printer) in which a plurality of heads 31 is arranged in the paper width direction and an image is printed by transporting the medium S under the plurality of heads 31 is taken as an example. However, it is not limited to this. For example, a printer is also acceptable in which after transporting continuous paper to a printing area an image is formed by repeating an operation of forming an image on the paper located at the printing area while moving a plurality of heads in a paper transport direction and an operation of moving the plurality of heads in a paper width direction, thereafter, the paper portion in which printing is not yet completed is transported to the printing area, and an image is then formed thereon.

Concerning the Dot Omission Detection Unit 50

In the above-described embodiments, a voltage-dividing circuit is not provided at the dot omission detection unit 50 and abnormality of the electrode for detection 58 is detected on the basis of a change in electrical state, which is caused by the electric current for discharge detection, If. However, it is not limited to this, but a configuration may also be adopted in which a power supply voltage is divided by a voltage-dividing circuit and on the basis of the detected voltage abnormality of the electrode for detection 58 is detected.

Also, in the above-described embodiments, the electrode for detection 58 is set to have a potential higher than that of the nozzle face and a change in potential of the electrode for detection 58, which is caused by the discharging of ink droplets, is extracted by using the capacitor for detection 54. However, it is not limited to this. For example, a configuration may also be adopted in which the nozzle plate 32 is connected to the high-voltage power supply unit so as to have a high potential and the electrode for detection 58 is connected to the ground so as to have the ground potential, and a dot omission nozzle may also be detected by a change in potential of the nozzle plate 32. Also, it is not limited to a configuration in which the nozzle plate 32 has the ground potential, but, if it is a configuration in which ink which is discharged from a nozzle has the ground potential, the nozzle plate 32 may not be set as an electrode. For example, a configuration may also be adopted in which an electrically-conductive material which is conductively connected to ink in a nozzle is provided at a wall surface of an ink flow path, a pressure chamber, or the like and the electrically-conductive material is set to have the ground potential. Also, the invention is not limited to a configuration which makes ink have the ground potential, but it is enough if a potential difference required for detection is present between ink and the electrode for detection 58.

Concerning Liquid Discharging Apparatus

In the above-described embodiments, the ink jet printer is illustrated as the liquid discharging apparatus. However, the invention is not limited to this. If it is a fluid discharging apparatus, the invention is also applicable to various industrial apparatuses besides a printer (a printing apparatus). The invention can also be applied to, for example, a printing apparatus for applying a pattern on a cloth, a color filter manufacturing apparatus, an apparatus for manufacturing a display such as an organic EL display, a DNA chip manufacturing apparatus which manufactures a DNA chip by applying solution in which DNA is melted on a chip, or the like.

Also, a liquid discharging method may also be a piezo method which discharges liquid by expanding or contracting an ink chamber by application of a voltage to a driving device (a piezoelectric device) or a thermal method which generates air bubbles in a nozzle by using a heater element and discharges liquid via the air bubbles.

What is claimed is:

1. A discharge inspection apparatus comprising:

a first electrode for detection which faces a nozzle, that discharges liquid with a first potential, at a predetermined spacing and has a second potential different from the first potential;

a second electrode for detection which faces a nozzle, that discharges the liquid of the first potential at a predetermined spacing and has the second potential;

an inspection section which inspects whether or not liquid is discharged from the nozzle on the basis of electrical changes which occur at the first electrode for detection and the second electrode for detection due to the discharging of the liquid of the first potential from the nozzle;

a first insulating receiving section which holds the first electrode for detection; and a second insulating receiving section which holds the second electrode for detection and is disposed with a space interposed between the second receiving section and the first receiving section.

2. The discharge inspection apparatus according to claim 1, wherein in at least one receiving section of the first receiving section and the second receiving section, the end edge on the space side among end edges of the upper surface of the receiving section protrudes further than the electrode for detection.

3. The discharge inspection apparatus according to claim 1, wherein in at least one receiving section of the first receiving section and the second receiving section, a cutout portion is provided at the side surface on the space side among side surfaces of the receiving section.

4. The discharge inspection apparatus according to claim 3, wherein the cutout portion has a surface which forms an angle of 90 degrees with respect to the side surface of the receiving section and a surface which forms an angle of 90 degrees with respect to the bottom surface of the receiving section.

5. The discharge inspection apparatus according to claim 4, wherein another cutout portion is provided at the surface which forms an angle of 90 degrees with respect to the side surface of the receiving section, among the surfaces that the cutout portion has.

6. The discharge inspection apparatus according to claim 1, wherein the first receiving section and the second receiving section are mounted on a base member, and an insulation treatment is carried out on the surface of the base member, which comes into contact with the first receiving section and the second receiving section.

7. The discharge inspection apparatus according to claim 1, wherein the first receiving section and the second receiving section are mounted on a base member, a signal line which is connected to the first electrode for detection penetrates the first receiving section and the base member, and a signal line which is connected to the second electrode for detection penetrates the second receiving section and the base member.

8. A discharge inspection method comprising:

making a nozzle which discharges liquid of a first potential face a first electrode for detection which has a second potential different from the first potential and is held on a first insulating receiving section;

inspecting whether or not liquid is discharged from the nozzle on the basis of an electrical change which occurs at the first electrode for detection due to the discharging of the liquid of the first potential from the nozzle;

making a nozzle which discharges the liquid of the first potential face a second electrode for detection which has the second potential and is held on a second insulating receiving section which is disposed with a space interposed between the second receiving section and the first receiving section; and inspecting whether or not liquid is discharged from the nozzle on the basis of an electrical change which occurs at the second electrode for detection due to the discharging of the liquid of the first potential from the nozzle.

* * * * *